(12) United States Patent
High et al.

(10) Patent No.: US 10,974,392 B2
(45) Date of Patent: Apr. 13, 2021

(54) AUTOMATED ROBOTIC SECURITY SYSTEM

(71) Applicant: International Business Machines Corporation, Armonk, NY (US)

(72) Inventors: Cynthia High, Round Rock, TX (US); Cheryl King, Austin, TX (US); Alan Villa, Austin, TX (US); Chuka Obinabo, Austin, TX (US); Andrew R. Jones, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 16/003,494

(22) Filed: Jun. 8, 2018

(65) Prior Publication Data

US 2019/0375109 A1 Dec. 12, 2019

(51) Int. Cl.
| | |
|---|---|
| *B25J 9/16* | (2006.01) |
| *G06K 9/66* | (2006.01) |
| *G06K 9/00* | (2006.01) |
| *B25J 11/00* | (2006.01) |
| *G08B 21/18* | (2006.01) |
| *H04N 5/225* | (2006.01) |

(52) U.S. Cl.
CPC ........... *B25J 9/1697* (2013.01); *B25J 11/002* (2013.01); *G06K 9/00664* (2013.01); *G06K 9/66* (2013.01); *G08B 21/18* (2013.01); *H04N 5/2253* (2013.01)

(58) Field of Classification Search
USPC .................................................. 700/245–264
See application file for complete search history.

(56) References Cited

U.S. PATENT DOCUMENTS

| 7,030,757 | B2 * | 4/2006 | Matsuhira ........ G08B 13/19645 340/521 |
| 8,352,072 | B2 * | 1/2013 | Gal ..................... G05D 1/0038 700/245 |
| 8,830,057 | B1 * | 9/2014 | Poursohi ................ G01N 33/00 340/540 |
| 9,020,682 | B2 * | 4/2015 | Shitamoto ........... G05D 1/0274 701/26 |

(Continued)

FOREIGN PATENT DOCUMENTS

| EP | 3118826 A1 | 1/2017 |
| WO | 2017152070 A1 | 9/2017 |

OTHER PUBLICATIONS

Unknown, "Aerial Security," Enhance Your Security Operation with Advanced Drone Technologies, http://www.aptonomy.com/, 12 pgs., printed Apr. 12, 2018.

(Continued)

*Primary Examiner* — Jonathan L Sample
(74) *Attorney, Agent, or Firm* — Peter K. Suchecki

(57) ABSTRACT

A robotic device may traverse along a path that connects a set of observation points in a monitored environment, each observation point having one or more associated target objects. The robotic device may capture an image of a target object at an observation point using a camera disposed on the robotic device. The robotic device may perform an image analysis on the captured image to determine whether the target object is in a correct state. The robotic device may perform a corrective action with respect to the target object in response to determining that the target object is in an incorrect state.

20 Claims, 10 Drawing Sheets

(56) References Cited

U.S. PATENT DOCUMENTS

| | | | |
|---|---|---|---|
| 9,494,936 B2 | 11/2016 | Kerzner | |
| 9,792,434 B1 | 10/2017 | Li et al. | |
| 9,984,558 B2* | 5/2018 | Artes | G08B 13/18 |
| 10,452,047 B2* | 10/2019 | Nomoto | H04N 7/185 |
| 2003/0206100 A1 | 11/2003 | Richman et al. | |
| 2005/0096790 A1* | 5/2005 | Tamura | G06N 3/008 700/245 |
| 2006/0069463 A1* | 3/2006 | Kim | G08B 13/1966 700/245 |
| 2006/0293793 A1 | 12/2006 | Tamura | |
| 2012/0197439 A1* | 8/2012 | Wang | G05D 1/0038 700/259 |
| 2013/0329052 A1* | 12/2013 | Chew | G06K 9/00771 348/159 |
| 2015/0339589 A1* | 11/2015 | Fisher | G06K 9/00771 706/12 |
| 2016/0116914 A1* | 4/2016 | Mucci | G05D 1/101 701/2 |
| 2017/0019644 A1* | 1/2017 | K V | B64C 39/02 |
| 2017/0225321 A1* | 8/2017 | Deyle | B25J 9/1679 |
| 2019/0213438 A1* | 7/2019 | Jones | G06K 9/00362 |

OTHER PUBLICATIONS

Rose, "Y-cam HomeMonitor Indoor and Outdoor Review," https://web.archive.org/web/20170622031837/http://www.securitygem.com/y-cam-homemonitor-indoor-and-outdoor-review/, Mar. 23, 2017, Security Gem, 18 pgs.

Unknown, "Hawkeye the Indoor Smart Drone Security Guard," https://www.indiegogo.com/projects/hawkeye-the-indoor-smart-drone-security-guard-drones#, 23 pgs., printed Apr. 12, 2018.

Unknown, "Smart Home Door Lock Security—Home Connect Technology, Remote Door Locks," https://www.kwikset.com/Wireless-Technology/HomeOwners/index.aspx, 4 pgs., printed Apr. 12, 2018.

Luo et al., "The Development of Intelligent Home Security Robot," Mechatronics, ICM'05 IEEE International Conference on, pp. 422-427, IEEE, 2005.

Unknown, "Home Monitoring Indoor Camera Kit KK-HN6001," https://www.panasonic.com/nz/consumer/home-monitoring/home-monitoring-kits/kx-hn6001.html, 3 pgs., © 2018 Panasonic New Zealand, printed Apr. 12, 2018.

Unknown, "Our drone-based Solution," Pixiel Security, Advanced Unmanned Protection, https://www.pixiel-security.com, 3 pgs., printed Apr. 12, 2018.

Henrich, A., "Rook drone lets users fly around their homes from anywhere in the world," https://www.newatlas.com/rook-drone-indoors/41830, 2 pgs., Feb. 15, 2016, printed Apr. 12, 2018.

Unknown, "10 Surprising Home Burglary Stats and Facts," The SafeWise Report, https://www.safewise.com/blog/8-surprising-home-burglary-statistics, 13 pgs, © Safewise 2018, printed Apr. 12, 2018.

Unknown, "Outside insight, Surround your home with brighter security," Sunflower Labs, Home Security Drone, https://sunflower-labs.com/, 12 pgs., printed Apr. 12, 2018.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

AUTOMATED ROBOTIC SECURITY SYSTEM

BACKGROUND

The present disclosure relates generally to the field of robotic systems, and more particularly to a robotic device for autonomously monitoring entry points and other hazards within an environment.

Robotic devices may be used for monitoring various environments, such as homes, offices, or industrial buildings. Some robotic devices may be used to determine various unsecured entry points or other hazards in an environment but require a user to operate the robotic device remotely. Other security systems utilize motion detectors and stationary cameras to monitor an environment, but these systems are limited in detection capabilities because they lack mobility. Lastly, various smart locking mechanisms, capable of being remotely operated by a user, are available for use on entry points of an environment. However, these smart locking mechanisms require the replacement of hardware at each entry point.

SUMMARY

Embodiments of the present disclosure include a method, computer program product, and system for monitoring an environment to automatically detect unsecured entry points and other hazards using a robotic device. The robotic device may traverse along a path that connects a set of observation points in a monitored environment, each observation point having one or more associated target objects. The robotic device may capture an image of a target object at an observation point using a camera disposed on the robotic device. The robotic device may perform an image analysis on the captured image to determine whether the target object is in a correct state. The robotic device may perform a corrective action with respect to the target object in response to determining that the target object is in an incorrect state.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
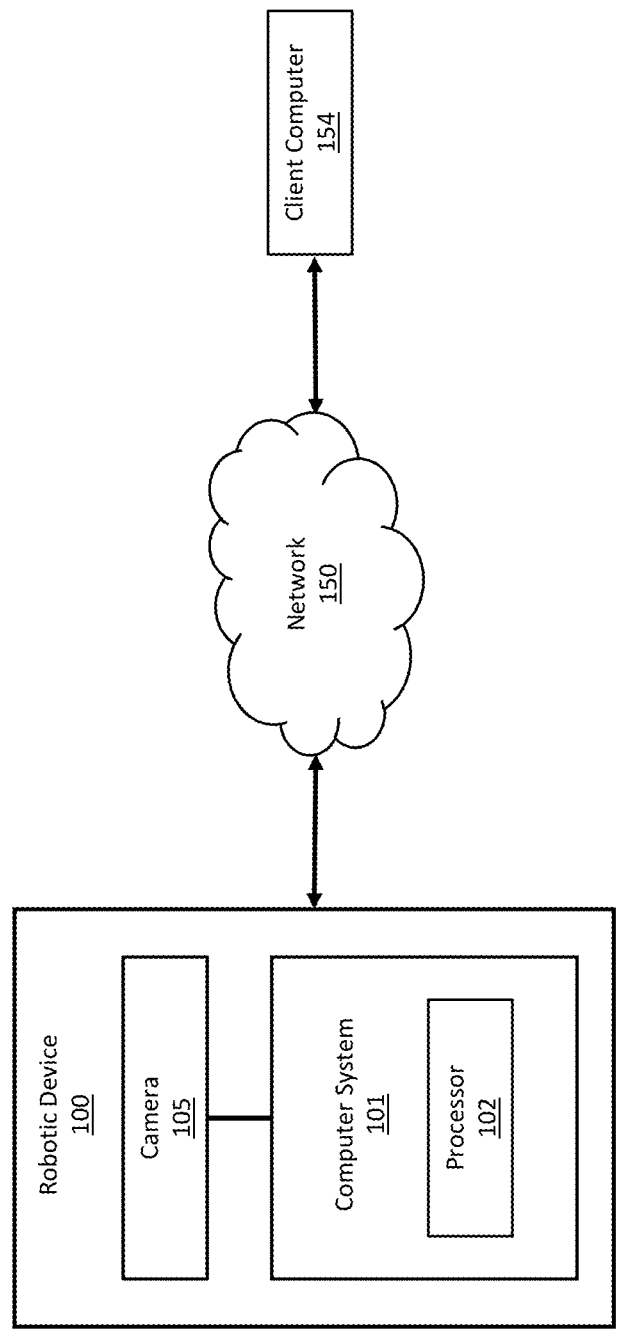
FIG. 1 illustrates a block diagram of a robotic device and system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of robotic systems, and more particularly to a robotic device for automatically monitoring entry points and other hazards within an environment. While the present disclosure is not necessarily limited to such applications, various aspects of the disclosure may be appreciated through a discussion of various examples using this context.

Robotic devices, such as drones, may be utilized to monitor an environment. Typically, the drone must be manually operated by a user, wherein the user can visually see a target object through an operably connected camera and video feed. However, embodiments of the present disclosure allow a robotic device to monitor the environment autonomously without the need of human intervention. In some disclosed embodiments, the robotic device is configured to utilize machine learning to learn an environment, capture images of target objects at various observation points within the environment, and perform a corrective action when a target object is in an incorrect state.

An example of the monitored environment is a home, wherein each observation point is an entry point, such as a window or an entry door, or a potentially hazardous object, such as an oven. The respective target object to the window and the entry door would be an associated lock. In some embodiments, the robotic device is configured to traverse the home to monitor the status of each window and entry door. The robotic device uses machine learning to determine whether the respective lock of the window or entry door is in an incorrect state. For example, if the robotic device traverses the path at night, an unlocked door or window may be in the incorrect state. If a door/window is determined to be unlocked, the robotic device performs a corrective action. In some embodiments, the corrective action performed by the robotic device includes sending an alert to inform a user of the status of the lock. In some embodiments, the robotic device may be configured to physically alter the state of the lock by placing it in the locked position or the correct state.

Referring now to FIG. 1, shown is a block diagram of a robotic device and a system, in accordance with embodiments of the present disclosure. In the illustrated embodiment, the robotic device 100 includes a computer system 101 having a processor 102 and an operably connected camera 105. The computer system 101 may be substantially similar to, or the same as, computer system 1101 described in FIG. 8. In some embodiments, the robotic device 100 is communicatively connected to a client computer 154 via a network 150, such as a cloud computing network. The client computer may be any type of computing device, such as a laptop computer, desktop computer, or mobile device. In some embodiments, the operably connected camera 105 may include various lenses, such as an infrared lens, wherein the infrared lens allows the robotic device to capture images without visible light.

Figure 9:
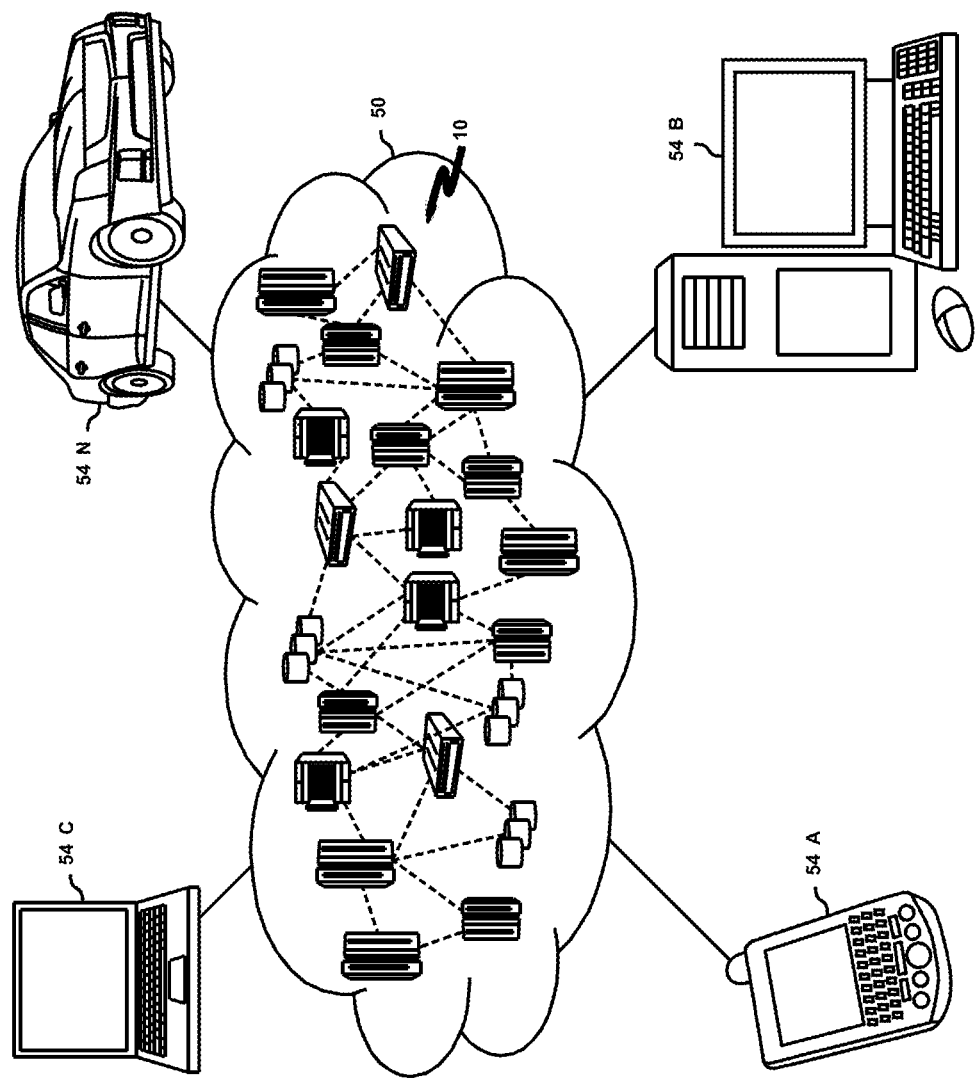
FIG. 9 depicts a cloud computing environment, in accordance with embodiments of the present disclosure.
Figure 10:
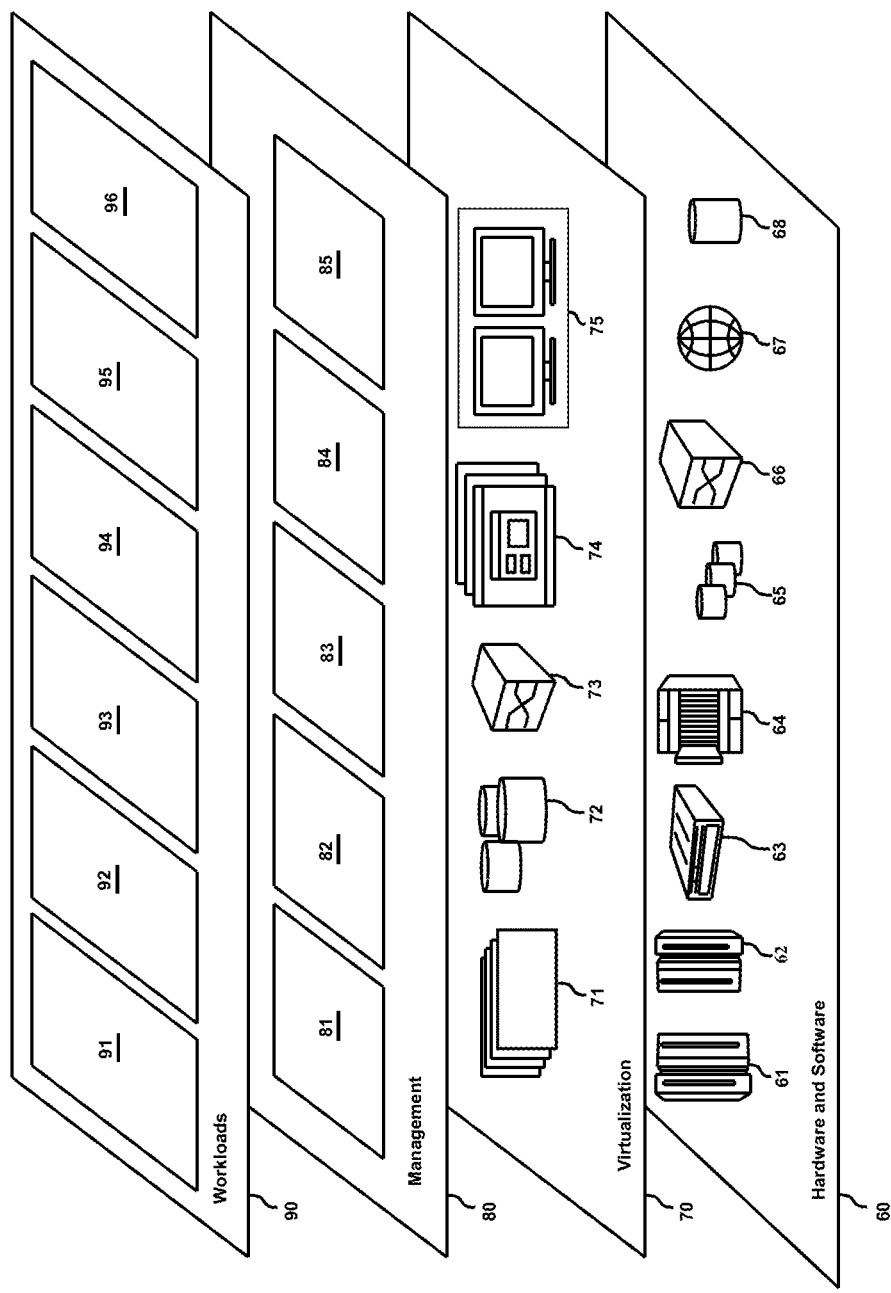
FIG. 10 depicts abstraction model layers, in accordance with embodiments of the present disclosure.

The network 150 may be substantially similar to, or the same as, network 50 described in FIG. 9 and FIG. 10. In some embodiments, the network can be implemented using any number of any suitable communications media. For example, the network may be a wide area network (WAN), a local area network (LAN), an internet, or an intranet. In certain embodiments, the various systems may be local to each other, and communicate via any appropriate local communication medium. For example, the robotic device 100 may communicate with the client computer 154 using a local area network (LAN), one or more hardwire connections, a wireless link or router, or an intranet. In some embodiments, the various systems may be communicatively coupled using a combination of one or more networks and/or one or more local connections. For example, the robotic device 100 may communicate with a base station (not shown) using a wireless network (e.g., a router), and the base station may be hardwired (e.g., connected with an Ethernet cable) to the client computer 154.

In some embodiments, the robotic device receives instructions from a user via the communicatively connected client computer 154. In some embodiments, the robotic device may receive instructions through a control system that is communicatively connected thereto. In some embodiments, the robotic device may be configured to perform training and monitoring methods autonomously.

In some embodiments, the robotic device 100 further includes a base station configured to dock the robotic device. The base station may include an interface that is adapted to receive instructions from a user, wherein the instructions may be transmitted to the robotic device. The instructions cause the robotic device to perform a method, such as training the robotic device to monitor an environment. In some embodiments, the base station is communicatively connected to the network 50. The base station is further configured to charge a battery of the robotic device.

Figure 2:
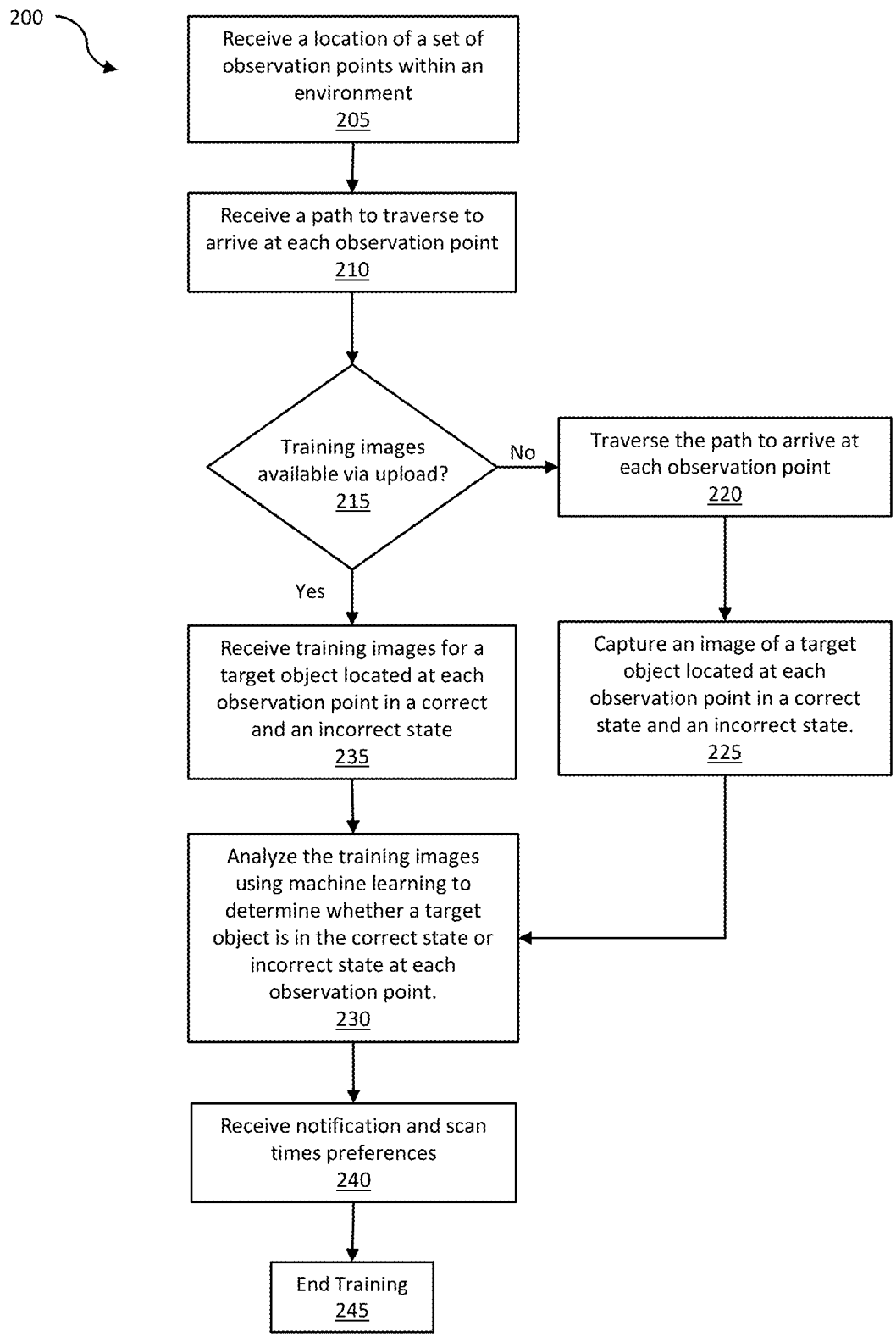
FIG. 2 illustrates a flow diagram of an example method for training a robotic device to identify the current state of a target object, in accordance with embodiments of the present disclosure.

Referring now to FIG. 2, shown is a flow diagram of an example process 200 for training a robotic device to identify the current state of a target object, in accordance with embodiments of the present disclosure. The process 200 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 200 is a computer-implemented process.

The process 200 begins by a robotic device receiving a location of a set of observation points within an environment. This is illustrated by step 205. The environment may be any type of environment, such as a home, office, commercial or industrial building. The set of observation points are contemplated to include various entry points of a building, such as doors and windows that utilize locking mechanisms. Further, the set of observation points may include other variables, such as, stovetops, light switches, appliances, and other potential hazards within the environment. In some embodiments, the determination of the location of the set of observation points may be received by the robotic device by scanning the environment using an operably connected camera. In some embodiments, during training a user brings the robotic device to the location of each observation point, wherein a GPS location of the observation point can be determined.

The process continues by the robotic device receiving a path to traverse in order to arrive at each observation point. This is illustrated by step 210. Once the location of each observation is determined, the robotic device determines the defined route to each observation point without intervention through visual recognition of what to expect at the predefined locations. In some embodiments, the robotic device may be a land vehicle, such as a robotic vacuum cleaner. While in other embodiments, the robotic device may be a flying vehicle, such as a drone. It is contemplated that depending on the embodiment of the robotic device, more than one path may be taken by the robotic device to arrive at the location of each observation point. Further, the robotic device may be configured to automatically determine other paths to an observation point in the event that the programmed path becomes blocked. In some embodiments, the robotic device may determine the path using characteristics of the robotic device (e.g., wheel size, the ability to traverse stairs or open doors, flight ability).

Once the set of observation points and the path are received by the robotic device, training the robotic device with training images can begin. In some embodiments, this step can be accomplished in one or more ways.

If no training images are available, the process continues by the robotic device traversing the path to arrive at each programmed observation point of the set of observation points. This step is illustrated by steps 215 and 220.

Each observation point includes one or more target objects located therein. The target object may be an object that can be physically manipulated, such as a door lock, window lock, light switch, or stovetop knob. It is contemplated that each target object includes a correct state and incorrect state for training purposes. Examples of target objects in both the correct state and incorrect state are exemplified in FIG. 4A, FIG. 4B, FIG. 5A, and FIG. 5B. For example, the correct state for a door lock at night may include having the deadbolt knob positioned towards the doorframe to engage the deadbolt within an opening of the strike plate on the doorframe (see FIG. 4B). Whereas, the incorrect state for a door lock at night may have the deadbolt knob positioned away from the doorframe, disengaging the deadbolt from the opening of the strike plate (see FIG. 4A).

The correct state for a target object may depend on various factors, such as the time of day, and the state of a target object may be the correct state at a first time (e.g., during the day), and the same state may be the incorrect state at a second time (e.g., at night). Additionally, the correct state for each target object may be independent. For example, the target objects may include three lights switches. At a given time, two of the light switches may be in the correct state if they are off, while the third may be in a correct state if it is on.

Once at an observation point, the process continues by the robotic device capturing one or more training images of a target object located at the associated observation point in a correct state and an incorrect state. This is illustrated in step 225. In some embodiments, a user places the target object in both the correct state and the incorrect state, while the robotic device captures images of each state. However, it is contemplated that in some embodiments, the robotic device is configured to physically manipulate the target object autonomously during training without the need of human intervention. In some embodiments, the training images may be saved locally on the robotic device. In some embodiments, the training images may be transmitted and uploaded to a base station, a communicatively linked client computer, or within a cloud computing network, wherein they can be stored for processing.

Once the images are captured, the process continues by the robotic device analyzing the training images using machine learning. This step is illustrated in step 230. In some embodiments, the image analysis is performed by machine learning software, for example, facial recognition, vector feature extraction, or IBM Watson technology. In some embodiments, the captured training images are categorized for each observation point, wherein a plurality of images for each respective target object include a first set of training images showing the respective target object in the incorrect state and a second set of training images showing the respective target object in the incorrect state. The plurality of images are analyzed by the robotic device using machine learning to configure the robotic device to be capable of determining whether each target object is in the correct state or incorrect state.

For example, the robotic device may use image analysis to extract various features from the plurality of training images (or the images captured at operation 225). The features may include, for example, angles and positioning of certain components (e.g., the locking mechanism), the presence of an illuminated light (e.g., on a stovetop, where a light may indicate that the stove is on), and an object visible in the image (e.g., a deadbolt visible in the gap between the door and door frame). As would be recognized by one of ordinary skill in the art, other features may be extracted depending on the type of target object, and the examples given herein should not be construed as limiting. The robotic device may then use machine learning to determine how the features correspond to the states (e.g., incorrect or correct) for the target object. Additionally, the robotic device may use machine learning to determine which features are irrelevant (e.g., provide no information on the state of the device), such as the color of a door.

In some embodiments, training images may be available via upload, obviating the need for the robotic device to traverse the path to take new training images. These steps are illustrated in steps 215 and 235. In some embodiments, it is contemplated that a user can capture images of each observation point and each respective target object in both the incorrect state and correct state by utilizing a camera on a mobile device, such as a smartphone. In some embodiments, the images are stamped with a GPS location of the observation point and uploaded to the robotic device. Once the training images are received, the process continues by the robotic device analyzing the training images using machine learning to determine the correct state and incorrect state of each target object. This allows the robotic device to be preprogrammed with the necessary images for determining the correct state and incorrect state of target objects that are located within the set of observation points.

The process continues by the robotic device receiving notification and scan time preferences. This is illustrated in step 240. The notification preference is programmed by a user, such that a user will receive an alert from the robotic device when the target object is in an incorrect state. The alert may be embodied in a text message, email, or mobile device application notification. This alert will notify the user that a target object, such as a door lock, is in an incorrect state (e.g., unlocked). Scan time preferences allow a user to set various times for the robotic device to perform an automatic scan of the environment. In some embodiments, the user may set scan time and notification preferences via a user interface located on the robotic device, an interface disposed on the base station, or by using a software application installed on a communicatively linked client computer.

Once the notification and scan time preferences are received, the process continues by ending training. This is illustrated in step 245. In some embodiments, once training has ended, the robotic device may return to a base station disposed at a location within the monitored environment. The robotic device will remain at the base station until a scan time is initiated indicating to the robotic device to monitor the environment.

Figure 3:
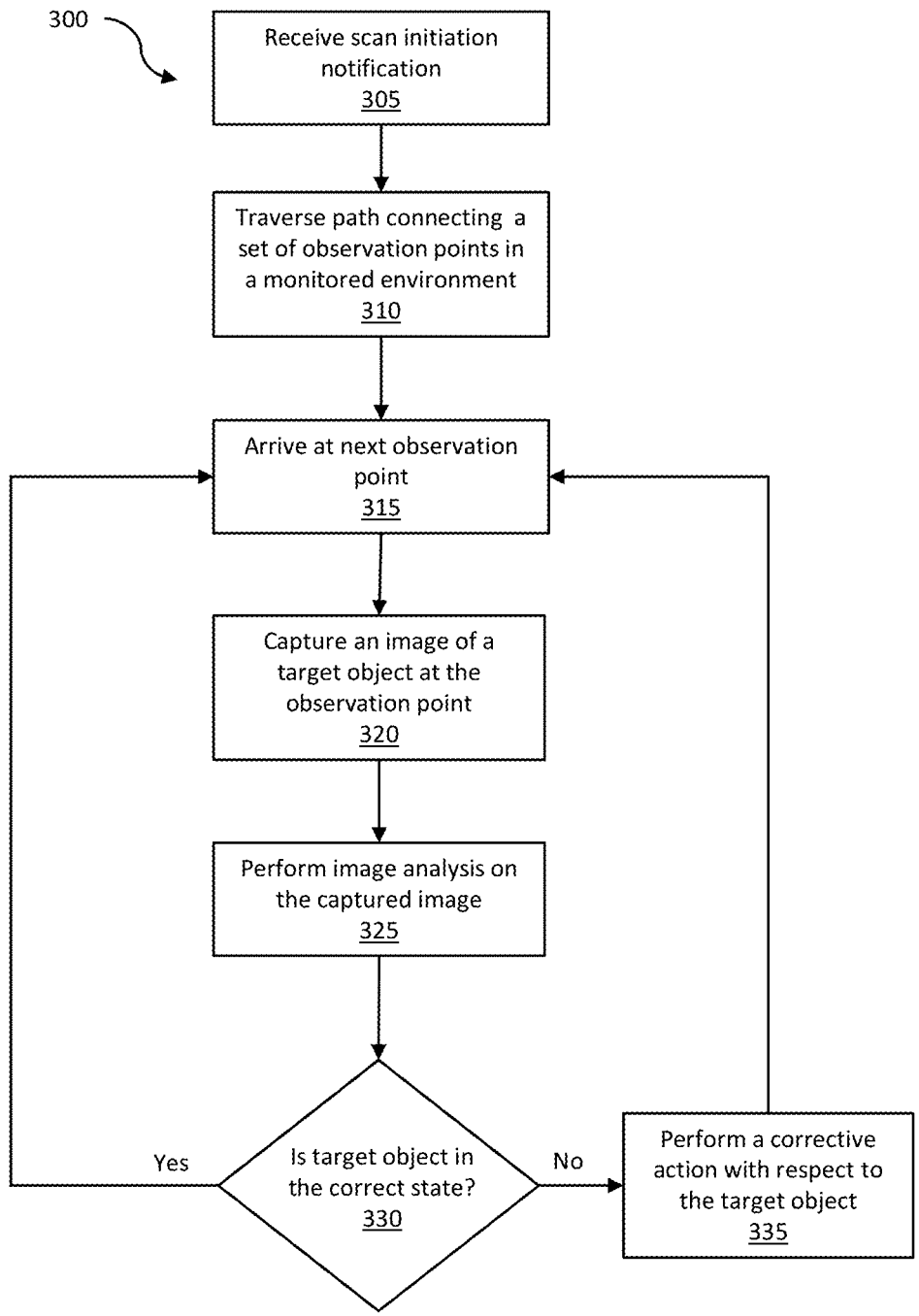
FIG. 3 illustrates a flow diagram of an example method for monitoring an environment by a robotic device, in accordance with embodiments of the present disclosure.

Referring now to FIG. 3, shown is a flow diagram of an example process 300 for monitoring an environment by a robotic device, in accordance with embodiments of the present disclosure. The process 300 may be performed by processing logic that comprises hardware (e.g. circuitry, dedicated logic, programmable logic, microcode, etc.), software (e.g., instructions run on a processor to perform hardware simulation), firmware, or a combination thereof. In some embodiments, the process 300 is a computer-implemented process.

The process 300 begins by the robotic device receiving a scan initiation notification. This is illustrated in step 305. The scan initiation notification communicates to the robotic device to begin monitoring the environment. The scan initiation notification may be set within the preferences, such that the robotic device will monitor the environment automatically at certain time intervals. In some embodiments, the scan initiation notification may be sent manually from a user via a client computer, such as, a mobile device.

The process continues by the robotic device traversing the path connecting the set of observation points in the monitored environment. This is illustrated in step 310. The path may be received from the initial training process described in FIG. 2. In some embodiments, the path may be included in the scan initiation notification. In some embodiments, the scan initiation notification may include a subset of observation point (e.g., some or all observation points in the area) to be monitored, and the robotic device may use path-finding algorithms to generate a path between the included observation points.

Figure 4A:
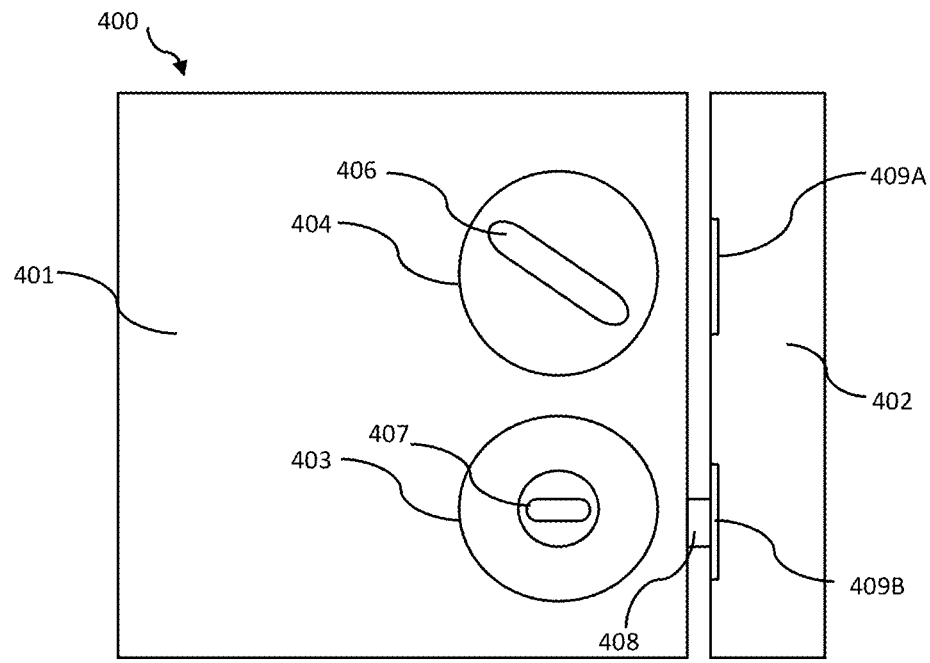
FIG. 4A illustrates an example of an entry door in an incorrect state, in accordance with embodiments of the present disclosure.
Figure 4B:
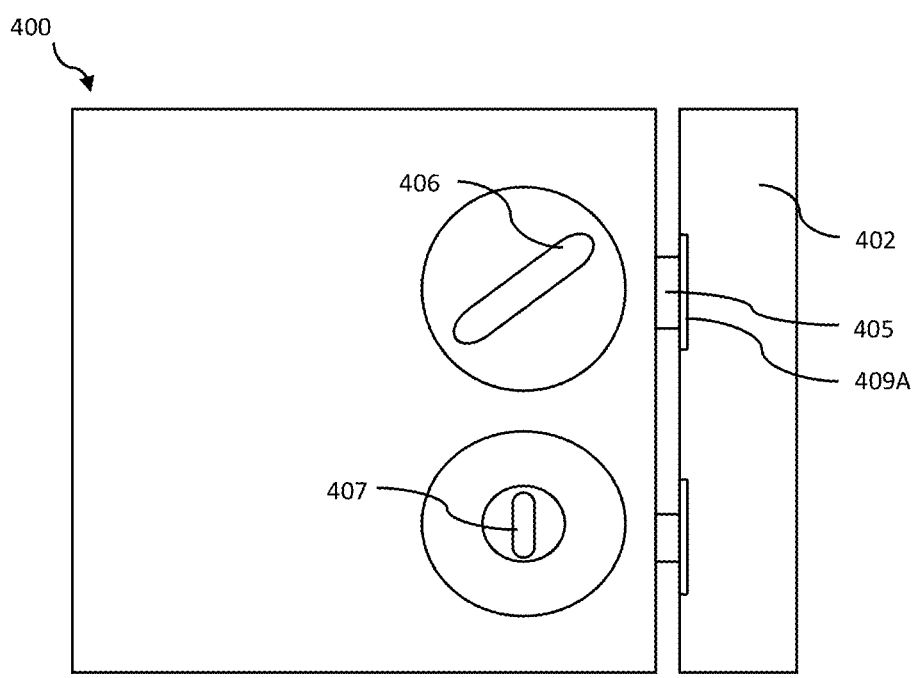
FIG. 4B illustrates an example of an entry door in a correct state, in accordance with embodiments of the present disclosure.

The process continues by the robotic device arriving at an observation point on the path. This is illustrated in step 315. Each observation point of the set of observation point includes one or more target objects. An example of an observation point may be a door, while the target object may be the doorknob or door lock of the door. In some embodiments, the observation point may have more than one target object as shown in FIG. 4A and FIG. 4B.

The process continues by the robotic device capturing one or more images of the target object at the observation point. This is illustrated in step 320. The one or more captured images are of the target object in its current state.

The process continues by the robotic device performing image analysis on the one or more captured images of the target object in its current state. This is illustrated in step 325. The robotic device performs the image analysis to determine if the target object is in the correct state or incorrect state by, for example, comparing the current image of the target object to the training images captured during the training process. In some embodiments, the image analysis is performed by machine learning software, such as, facial recognition, vector feature extraction, or IBM Watson technology. In some embodiments, the determination of the current state is determined by comparing extracted features (e.g., various angles) of the target object in both the correct state and incorrect state, taken from the training process images, and determining the highest percentage match of the current state of the target object compared to the training images. In some embodiments, this may be determined by utilizing a confidence interval set by a user. The confidence interval will be used to determine the probability of the current state of the target object.

In some embodiments, the robotic device may update the confidence interval over time. For example, the robotic device may send an alert to the user that the target object is in the incorrect state. The alert may include the image of the target object. The user may determine that the target object is actually in the correct state, and may notify the robotic device accordingly (e.g., through an application on the user's smart phone). The robotic device may use the captured image to update its prediction model and adjust the confidence interval. For example, the robotic device may add the captured image to its training images, and it may weigh the captured image more heavily than other images during training because it was previously incorrectly analyzed.

Once the image analysis is performed, a result is determined by the robotic device. This is illustrated in step 330. If the target object is determined to be in the correct state, the process continues by the robotic device arriving at the next observation point along the path. This is illustrated in step 315.

In some embodiments, the state of one or more of the target objects may be determined by the robotic device communicating with the target object. For example, the target object may be a smart lock communicatively coupled with the robotic device using wireless communication (e.g., Bluetooth, over a network). The robotic device may send a request for the state of the smart lock to the smart lock and analyzes a response to determine whether the smart lock is in the correct state. In these embodiments, the robotic device may not capture any images of the smart lock. In some embodiments, the robotic device may still capture and analyze images of the smart lock, which may be used to verify the information received from the smart lock.

If the target object is determined to be in the incorrect state, the process continues by the robotic device performing a corrective action with respect to the target object. This is illustrated in step 335. In some embodiments, the corrective action includes sending an alert to a user via communicatively connected client computer. The alert notifies the user that the target object is in an incorrect state and needs to be corrected. In some embodiments, the robotic device may be configured to physically alter the target object to place the target object in the correct state. This may be done by the robotic device using mechanical intervention or through the robotic device pushing a command, such as a command to a smart door lock to engage the lock.

Once the corrective action is performed, the process continues by the robotic device arriving at the next observation point. This is illustrated in step 315. The process repeats until all observation points have been processed. In some embodiments, the process will repeat until all target objects in the incorrect state are physically altered to the correct state. In some embodiments, once each observation point in the set of observation points has been monitored, the robotic device will return to the base station to await the next scheduled scan time.

Referring now to FIG. 4A, there is shown an example of a close up view of an entry door in a first state (e.g., an incorrect state), in accordance with embodiments of the present disclosure. For illustrative purposes, the discussion of FIGS. 4A and 4B assumes that the unlocked state is the incorrect state, and that the locked state is the correct state. However, as described herein, in some circumstances the unlocked state would be considered the correct state, such as when the door is an entry to a publicly accessible building and the image is taken during open hours. In the illustrated embodiment, the entry door 400 comprises a door 401, doorframe 402, doorknob 403, and a door lock 404. The door lock 404 is disposed within the door 401, wherein the door lock 404 includes a deadbolt 405 (see FIG. 4B) configured to engage a strike plate 409A and deadbolt knob 406. The doorknob 403 includes a lock 407 disposed on a distal end thereof, and a latch 408 that is received within a strike plate 409B of the doorframe.

During training and monitoring, the robotic device, travels the path to capture each target object at each observation point. In this example, the observation point is the entry door 400. The entry door 400 may have one or more associated target objects, wherein each target object has an incorrect state and a correct state. In FIG. 4A, the upper end of the deadbolt knob 406 is positioned at an angle away from the doorframe 402. In some embodiments, during training and monitoring an image would be captured by the robotic device of the deadbolt knob 406 position, as shown in FIG. 4A, and categorized as an incorrect state. In some embodiments, the deadbolt knob 406 may disposed parallel to the doorframe 402, wherein the deadbolt may be partially exposed from the door lock, but not fully engaged within the strike plate. This deadbolt knob position would be further categorized as a second state (e.g., a second incorrect state). In some embodiment, since the deadbolt is not fully engaged with the strike plate, this would still be considered the incorrect state as it is functionally the same (e.g., doesn't change the locked/unlocked status of the door).

In some embodiments, the doorknob 403 may include a door lock 407. In FIG. 4A, the door lock 407 is positioned perpendicular to the longitudinal axis of the door frame 407. This configuration would be categorized by the robotic device during training and monitoring as an incorrect state. In some embodiments, the space between the door 401 and the door frame 402 may also be used to indicate the state of the target object. In some embodiments, when there is no visual recognition of the deadbolt 405 engaged with the strike plate 409A, this may be categorized by the robotic device as an incorrect state.

Referring now to FIG. 4B, there is shown an example of a close up view of an entry door in the correct state, in accordance with embodiments of the present disclosure. In the illustrated embodiment, the upper end of the deadbolt knob 406 is positioned at an angle toward the door frame 402. Capturing an image of the deadbolt knob 406 in this position would be categorized as the correct state. In some embodiments, the target object includes the deadbolt 405, wherein the deadbolt is engaged with the strike plate 409A of the door frame 402, indicating a correct state. In some embodiments, the door lock 407 on the doorknob is positioned parallel to the doorframe 402, wherein this position is categorized as a correct state. In some embodiments, a locked door or locked lock is categorized as the correct state because the entry point is secure. Whereas, an unlocked door is categorized as being in the incorrect state because the entry point is unsecure.

Figure 5B:
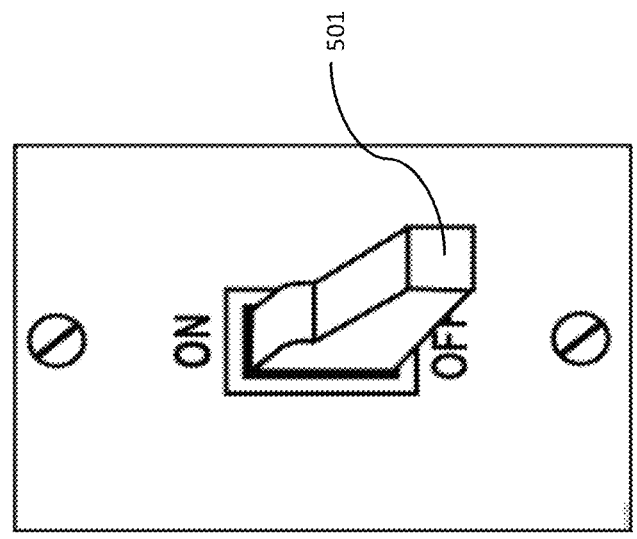
FIG. 5B illustrates an example of a light switch in a correct state, in accordance with embodiments of the present disclosure.
Figure 5A:
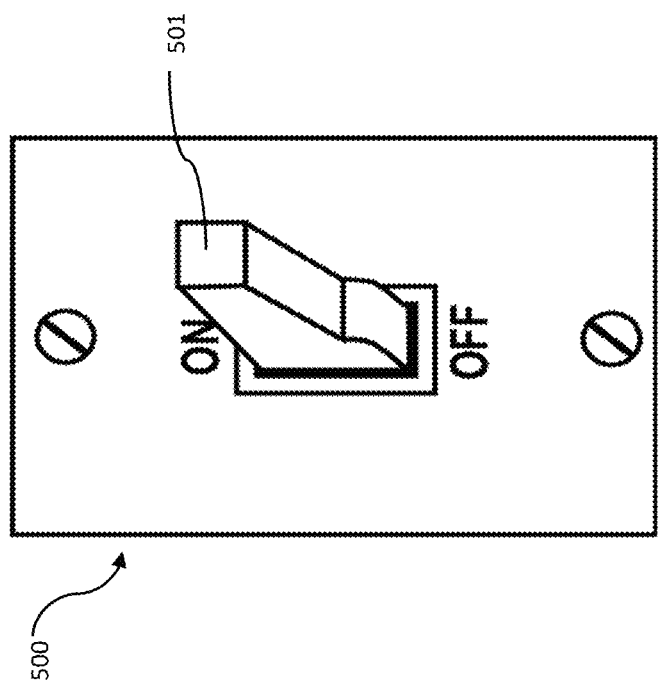
FIG. 5A illustrates an example of a light switch in an incorrect state, in accordance with embodiments of the present disclosure.

Referring now to FIG. 5A and FIG. 5B, shown is an example of a light switch in the incorrect state and an example of a light switch in the correct state, respectively, in accordance with embodiments of the present disclosure. For illustrative purposes, the discussion of FIGS. 5A and 5B assumes that the on state is the incorrect state, and that the off state is the correct state. However, as described herein, in some circumstances the on state would be considered the correct state. In some embodiments, the robotic device would monitor a home during the evening hours, wherein a user would program the robotic device to perform a corrective action with respect to any light switches being inadvertently left in the on position. In the illustrated embodiments, the light switch 500 includes a lever 501 that may be positioned in an on or off position. The light switch 500 is the observation point, wherein the lever 501 is the target object. Capturing an image of the light switch 500 with the lever 501 positioned upwardly toward the on position, as shown in FIG. 5A, would be categorized as the incorrect state for the target object. Alternatively, capturing an image of the light switch 500 with the lever positioned downwardly toward the off position, as shown in FIG. 5B would be categorized as the correct state for the target object.

Figure 6:
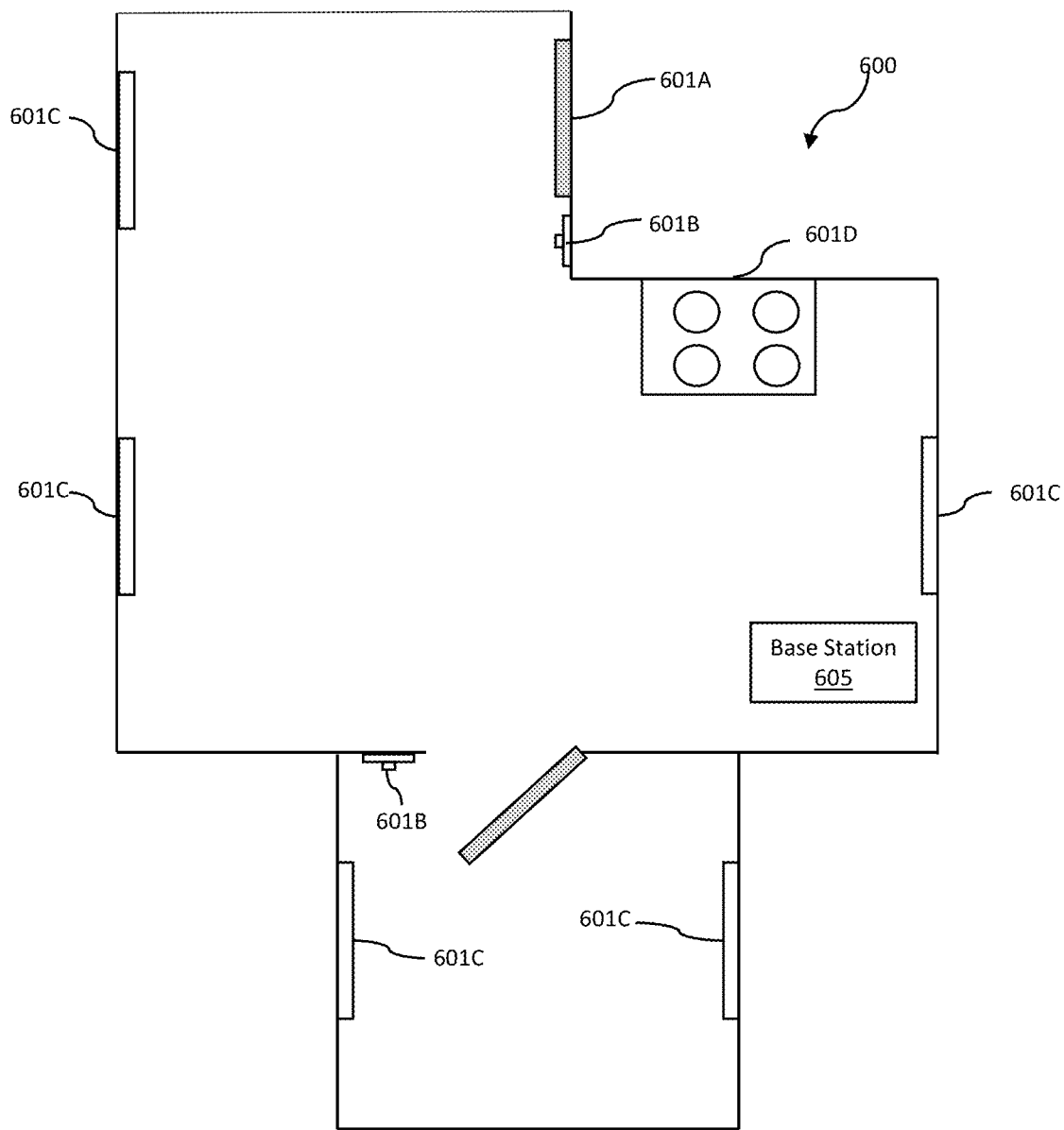
FIG. 6 illustrates a schematic view of a set of observation points within an environment, in accordance with embodiments of the present disclosure.

Referring now to FIG. 6, illustrated is a schematic view of a set of observation points within an environment, in accordance with embodiments of the present disclosure. In the illustrated embodiment, the environment is depicted as a home 600. The home includes a set of observation points 601A-C (collectively referred to as observation points 601) located at various positions around the home 600. The set of observation points may comprise of various types of observation points, such as an entry door 601A, light switches 601B, windows 601C, and/or a stovetop 601D. The home 600 further includes a base station 605, wherein the robotic device resides when docked. Each observation point includes one or more associated target objects, such as, a door lock, window lock, lever, or adjustment knob. Each target object is further categorized with an incorrect state and a correct state during training.

Figure 7:
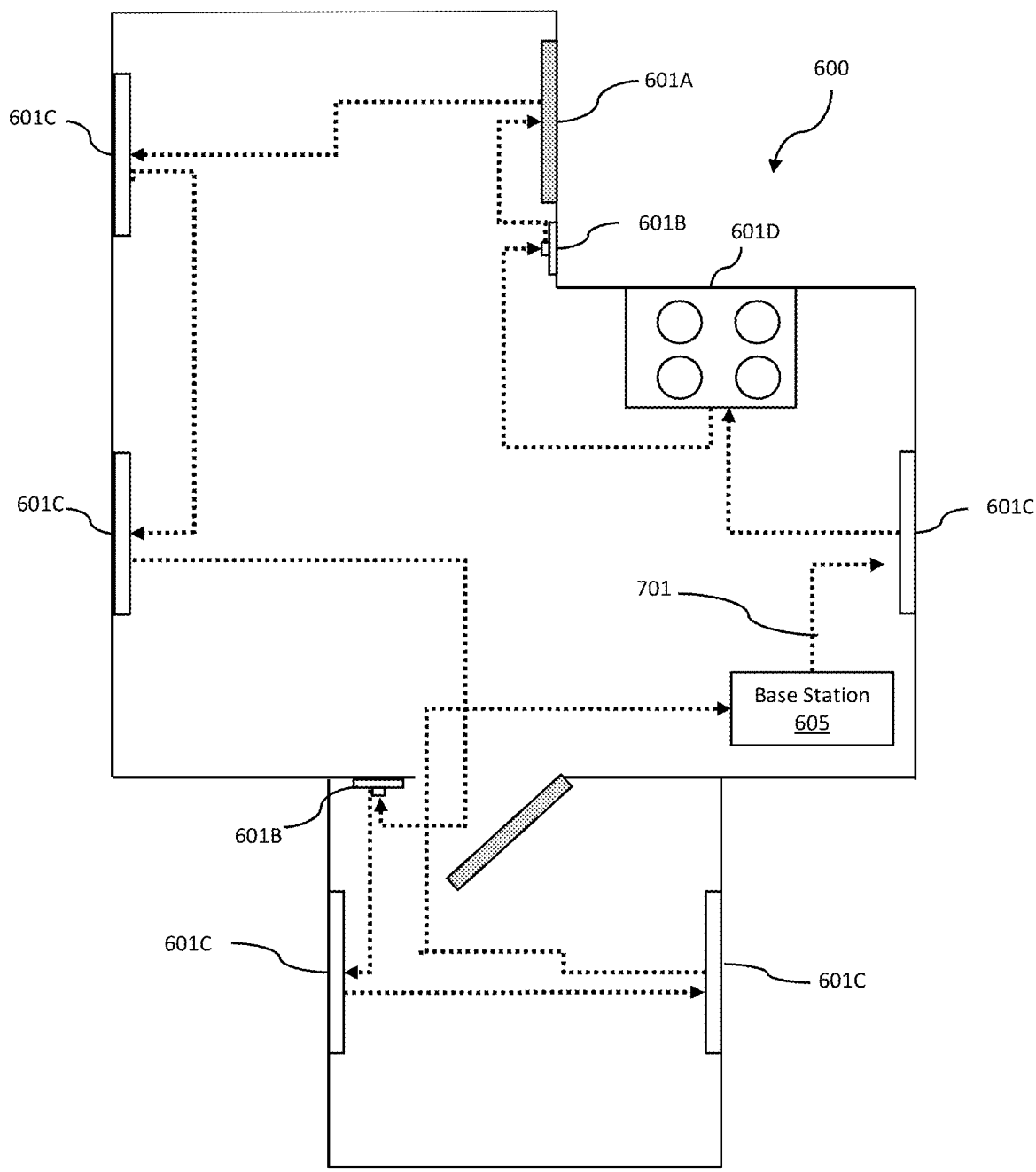
FIG. 7 illustrates an example path taken by a robotic device to arrive at each observation point within an environment, in accordance with embodiments of the present disclosure.

Referring now to FIG. 7, illustrated is an example path taken by a robotic device to arrive at each observation point within an environment, in accordance with embodiments of the present disclosure. During monitoring, a scan time notification is received by the robotic device, initiating the monitoring process. The robotic device traverses a path 701 to each observation point 601 within the environment, depicted here as a home 600. At each observation point, the robotic device captures an image of the target object and determines the current state of the object. If the target object, such as a lock, is in the incorrect state, the robotic device performs a corrective action, such as transmitting an alert to a user. Once the corrective action is performed, the robotic device moves to the next observation point 601 along the path 701. In some embodiments, the path 701 may be obstructed by an object, wherein the robotic device is configured to take an alternate route along the path. In some embodiments, the path 701 the robotic device traverses begins and ends at the base station 605.

Figure 8:
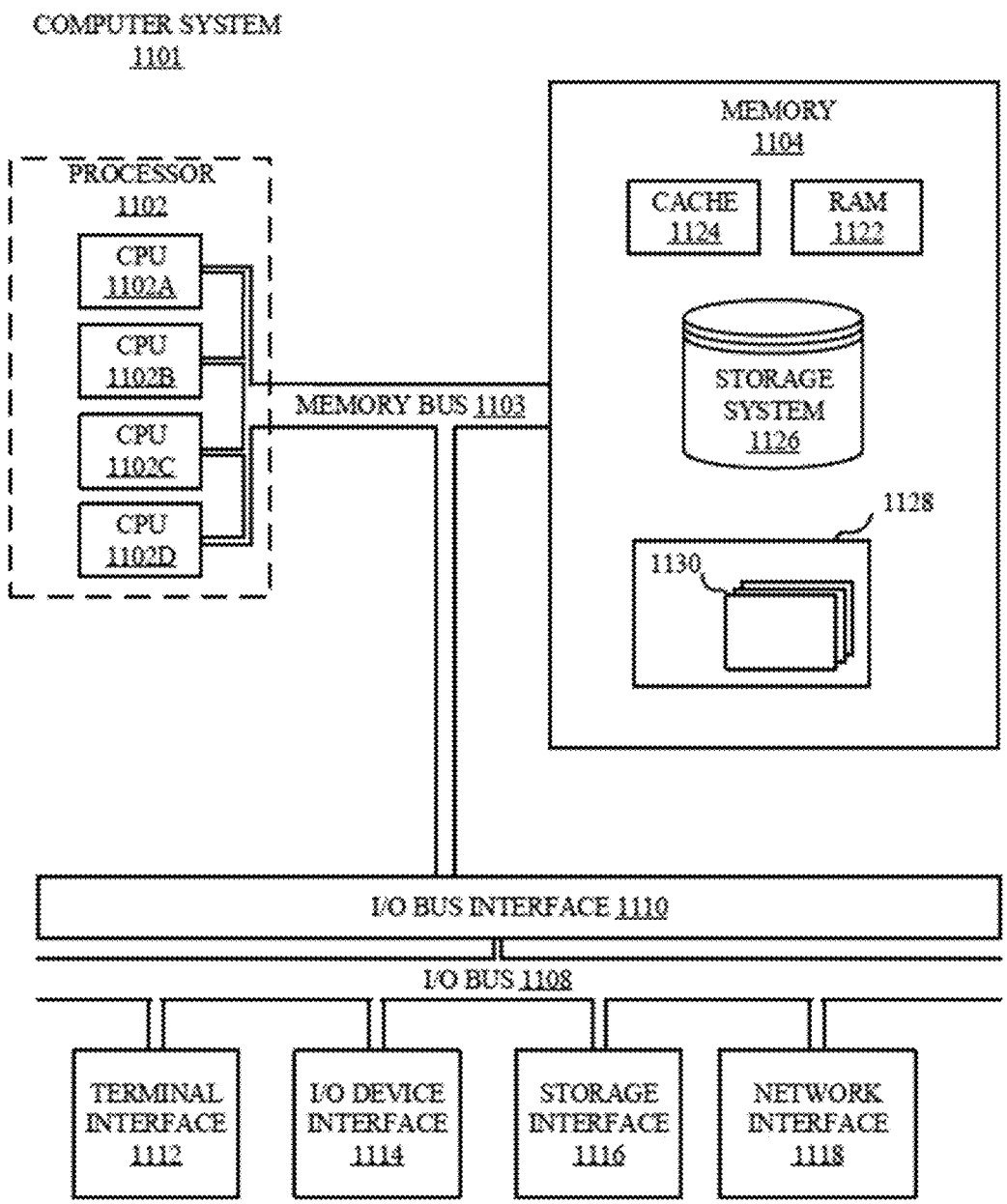
FIG. 8 illustrates a high-level block diagram of an example computer system that may be used in implementing one or more of the methods, tools, and modules, and any related functions, described herein, in accordance with embodiments of the present disclosure.

Referring now to FIG. 8, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 200 and 300).

System memory 1104 may include computer system readable media in the form of volatile memory, such as random access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

Although the memory bus 1103 is shown in FIG. 8 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interface units 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 8 is intended to depict the representative major components of an exemplary computer system 1101. In some embodiments, however, individual components may have greater or lesser complexity than as represented in FIG. 8, components other than or in addition to those shown in FIG. 8 may be present, and the number, type, and configuration of such components may vary.

One or more programs/utilities 1128, each having at least one set of program modules 1130 may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding of the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to those skilled in the art. Therefore, it is intended that the following claims be interpreted as covering all such alterations and modifications as fall within the true spirit and scope of the invention.

What is claimed is:

1. A method for monitoring an environment to automatically detect unsecured entry points and other hazards using a robotic device, the method comprising:
   traversing, by a robotic device, along a path that connects a set of observation points in a monitored environment, each observation point having one or more associated target objects;
   capturing, by the robotic device, an image of a target object at an observation point using a camera disposed on the robotic device;

performing image analysis, by the robotic device, on the image to determine whether the target object is in a correct state, wherein performing image analysis comprises:
  detecting a presence of an illuminated light indicating the target object is active;
  determining a current time of day; and
  identifying, based on the presence of the illuminated light and the time of day, that the target object is in an incorrect state;
performing, by the robotic device, a corrective action with respect to the target object in response to determining that the target object is in the incorrect state; and
proceeding, by the robotic device, along the path to a next observation point in the set of observation points.

2. The method of claim 1, wherein performing the corrective action comprises:
  generating, by the robotic device, an alert that indicates that the target object is in the incorrect state; and
  sending, by the robotic device, the alert to a user.

3. The method of claim 1, the method further comprising:
  receiving, by the robotic device, a location of each observation point in the set of observation points and the path to arrive at each observation point in the set of observation points;
  receiving, by the robotic device, a plurality of training images for each target object, the plurality of training images for each respective target object including a first set of training images showing the respective target object in the correct state and a second set of training images showing the respective target object in the incorrect state;
  analyzing, by the robotic device, the plurality of training images using machine learning to configure the robotic device to be capable of determining whether each target object is in the correct state or incorrect state.

4. The method of claim 1, wherein performing the corrective action comprises:
  correcting, automatically by the robotic device, the incorrect state for the target object by physically manipulating the target object.

5. The method of claim 1, wherein the method further comprises:
  returning, by the robotic device, to a base station.

6. The method of claim 1, wherein performing image analysis on the image to determine whether the target object is in the correct state further comprises:
  comparing, by the robotic device, a current image of a target object to a plurality of training images of the target object captured during a training process;
  determining, by the robotic device, a highest percentage match of a current state of the target object compared to the plurality of training images of the target object by utilizing a confidence interval set by a user.

7. The method of claim 1, wherein the robotic device is one of a drone, a robotic vacuum cleaner, and a land vehicle.

8. The method of claim 1, wherein the target object is one of a door lock, a window lock, a light switch, and a stove top knob.

9. The method of claim 2, wherein the alert is sent to the user using one of a mobile application notification, a text message, and an email.

10. A robotic device, comprising:
  a housing;
  a camera disposed on an outer surface of the housing;
  a processor, wherein the processor performs a method, the method comprising:
    traversing, by the robotic device, along a path that connects a set of observation points in a monitored environment, each observation point having one or more associated target objects;
    capturing, by the robotic device, an image of a target object at an observation point using a camera disposed on the robotic device;
    performing image analysis, by the robotic device, on a captured the image to determine whether the target object is in a correct state, wherein performing image analysis comprises:
      detecting, by the robotic device, a presence of an illuminated light indicating the target object is active;
      determining, by the robotic device, a current time of day; and
      identifying, by the robotic device and based on the presence of the illuminated light and the time of day, that the target object is in an incorrect state; and
    performing, by the robotic device, a corrective action with respect to the target object in response to determining that the target object is in the incorrect state.

11. The robotic device of claim 10, wherein the method performed by the processor further comprises:
  generating, by the robotic device, an alert that indicates that the target object is in the incorrect state; and
  sending, by the robotic device, the alert to a user.

12. The robotic device of claim 10, wherein the method performed by the processor further comprises:
  receiving, by the robotic device, a location of each observation point in the set of observation points and the path;
  receiving, by the robotic device, a plurality of training images for each target object, the plurality of training images for respective target objects including a first set of training images showing the respective target object in the correct state and a second set of training images showing the respective target object in the incorrect state;
  analyzing, by the robotic device, the plurality of training images using machine learning to configure the robotic device to be capable of determining whether each target object is in the correct state or incorrect state.

13. The robotic device of claim 10, wherein the method performed by the processor further comprises:
  correcting, automatically by the robotic device, the incorrect state for the target object by physically manipulating the target object.

14. The robotic device of claim 10, wherein the method performed by the processor further comprises:
  returning, by the robotic device, to a base station.

15. The robotic device of claim 10, wherein performing image analysis on the image to determine whether the target object is in the correct state further comprises:
  comparing, by the robotic device, a current image of a target object to a plurality of training images of the target object captured during a training process;
  determining, by the robotic device, a highest percentage match of a current state of the target object compared to the plurality of training images of the target object by utilizing a confidence interval set by a user.

16. A computer program product comprising a computer readable storage medium having program instructions embodied therewith, the program instructions executable by a processor operably connected to a robotic device, to cause the robotic device to perform a method comprising:

traversing, by a robotic device, along a path that connects a set of observation points in a monitored environment, each observation point having one or more associated target objects;

capturing, by the robotic device, an image of a target object at an observation point using a camera disposed on the robotic device;

performing image analysis, by the robotic device, on the image to determine whether the target object is in a correct state, wherein performing image analysis comprises:

detecting, by the robotic device, a presence of an illuminated light indicating the target object is active;

determining, by the robotic device, a current time of day; and identifying, by the robotic device and based on the presence of the illuminated light and the time of day, that the target object is in an incorrect state; and performing, by the robotic device, a corrective action with respect to the target object in response to determining that the target object is in the incorrect state.

17. The computer program product of claim 16, wherein the method performed by the robotic device further comprises:

generating, by the robotic device, an alert that indicates that the target object is in the incorrect state; and sending, by the robotic device, the alert to a user.

18. The computer program product of claim 16, wherein the method performed by the robotic device further comprises:

receiving, by the robotic device, a location of each observation point in the set of observation points and the path;

receiving, by the robotic device, a plurality of training images for each target object, the plurality of training images for respective target objects including a first set of training images showing the respective target object in the correct state and a second set of training images showing the respective target object in the incorrect state;

analyzing, by the robotic device, the plurality of training images using machine learning to configure the robotic device to be capable of determining whether each target object is in the correct state or incorrect state.

19. The computer program product of claim 16, wherein the method performed by the robotic device further comprises:

correcting, automatically by the robotic device, the incorrect state for the target object by physically manipulating the target object.

20. The computer program product of claim 16, wherein performing image analysis on the image to determine whether the target object is in the correct state further comprises:

comparing, by the robotic device, a current image of a target object to a plurality of training images of the target object captured during a training process;

determining, by the robotic device, a highest percentage match of a current state of the target object compared to the plurality of training images of the target object by utilizing a confidence interval set by a user.

\* \* \* \* \*